United States Patent [19]

Ogasawara et al.

[11] Patent Number: 5,671,037
[45] Date of Patent: Sep. 23, 1997

[54] HEAD MOUNTED IMAGE DISPLAY HAVING AT LEAST FOUR SUPPORTING POINTS

[75] Inventors: Yuji Ogasawara, Hino; Hiroyoshi Kobayashi, Hachioji; Yoshihiro Maeda, Hachioji; Motohiro Atsumi, Hachioji, all of Japan

[73] Assignee: Olympus Optical Co., Ltd., Tokyo, Japan

[21] Appl. No.: 530,738

[22] Filed: Sep. 19, 1995

[30] Foreign Application Priority Data

Sep. 19, 1994 [JP] Japan ................... 6-223114
Sep. 19, 1994 [JP] Japan ................... 6-223231

[51] Int. Cl.⁶ .................................................. G02C 1/00
[52] U.S. Cl. ........................... 351/158; 2/421; 345/905
[58] Field of Search ......................... 351/158, 41; 2/421, 2/452; 359/13, 14; 345/7, 8, 9, 905

[56] References Cited

U.S. PATENT DOCUMENTS 4,737,972  4/1988  Schoolman ................... 378/41
4,952,024  8/1990  Gale ............................. 359/13
5,003,300  3/1991  Wells ............................ 345/8
5,208,449  5/1993  Eastman et al. .............. 235/462
5,321,416  6/1994  Bassett et al. ................ 345/8

FOREIGN PATENT DOCUMENTS 5-85446   4/1993  Japan .
5-196898  8/1993  Japan .
6-22246   1/1994  Japan .

*Primary Examiner*—Huy Mai
*Attorney, Agent, or Firm*—Cushman, Darby & Cushman IP Group of Pillsbury Madison & Sutro LLP

[57] ABSTRACT

A head mounted image display includes a display body having image display sections and optical systems and a supporting section for fixing the display body in front of the eyes of an observer so that the observer can view the image display sections with his eyes. The supporting section has at least four supporting points, which are arranged so that at least one supporting point is placed outside a plane formed by at least three supporting points. Thus, the observer can comfortably wear the display.

15 Claims, 15 Drawing Sheets

FIG. 17A
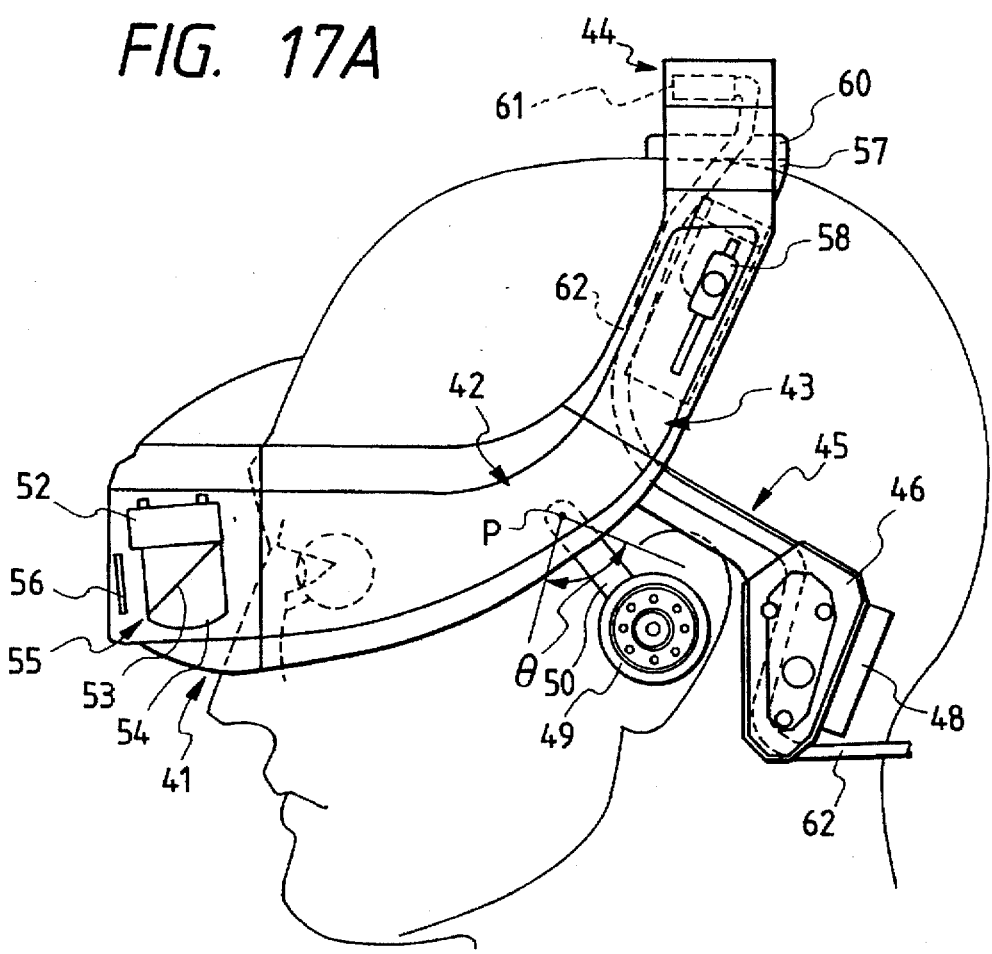
FIG. 17B
FIG. 17C
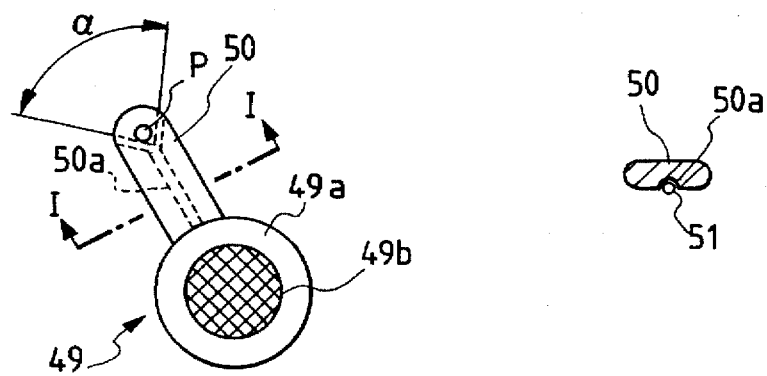

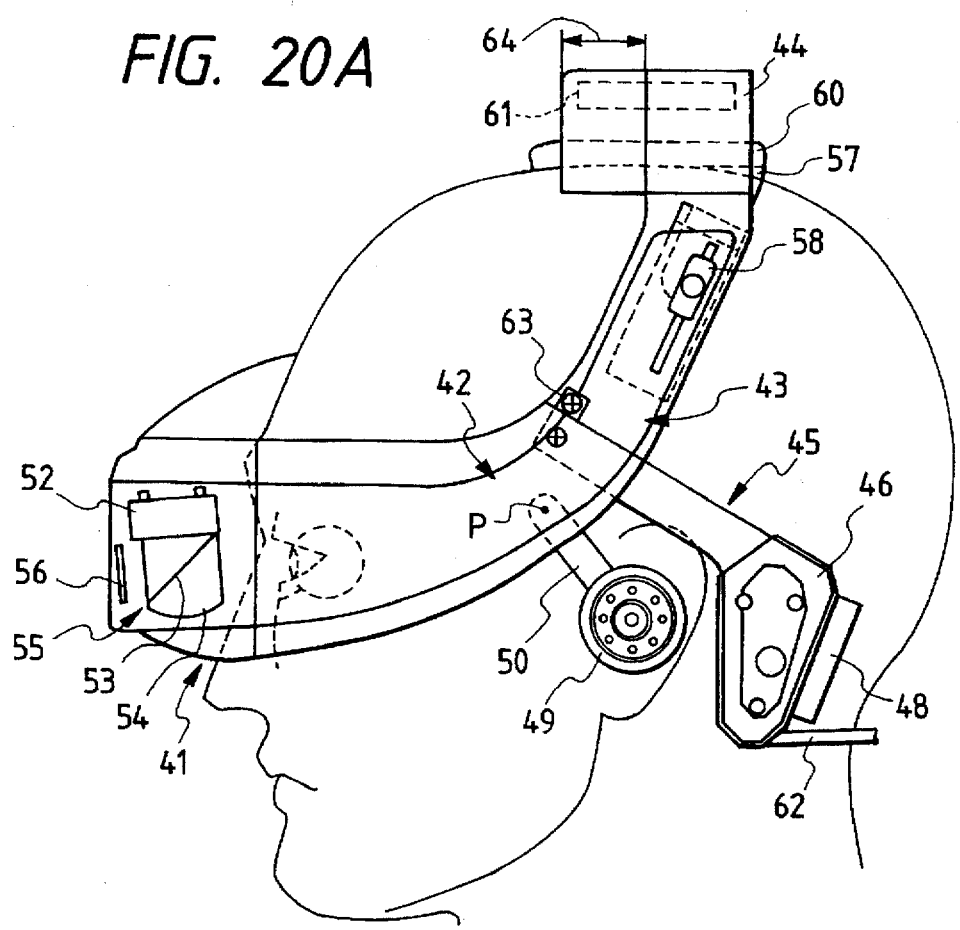
FIG. 20A
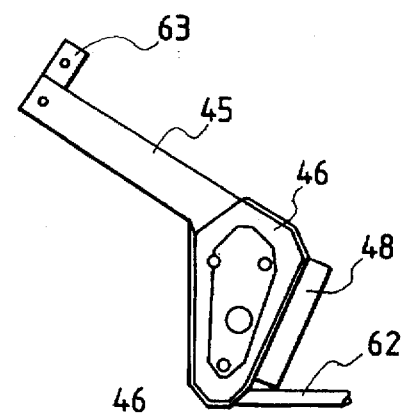
FIG. 20B
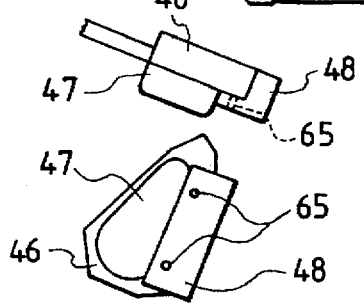
FIG. 20C
FIG. 20D

HEAD MOUNTED IMAGE DISPLAY HAVING AT LEAST FOUR SUPPORTING POINTS

BACKGROUND OF THE INVENTION

1. Field of the Invention

This invention relates to a head mounted image display which is suitable for use in an image and sound reproducing apparatus for obtaining the so-called virtual reality, supplying the eyes and ears of an observer with reproduced images and sounds at the same time.

2. Description of Related Art

In recent years, the development of head mounted image displays of helmet and goggle types has been promoted which are intended to bring about virtual reality or to enjoy a large-sized picture by oneself.

These displays, although some of them are not provided with sound-reproducing functions, each include, at least, an image display section using a liquid crystal with backlight and an optical system having a prism, a lens, a mirror, and the like for conducting its image to the eye, all of which are fixed in front of each eye. Since, however, each of the image display section and the optical system has considerable weight, the advent of comfortable and secure mounting means is hastened. Nevertheless, satisfactory means have so far been not proposed.

Prior art display mounting means fall roughly into the following five types. The first is of a helmet type such as that set forth in Japanese Patent Preliminary Publication No. Hei 5-85446. The second is of an eyeglass type such as that set forth in Japanese Patent Preliminary Publication No. Hei 5-196898 and the third is of a headphone type such as that disclosed in Japanese Patent Preliminary Publication No. Hei 6-22246. The fourth is of an annular headband type and the fifth is of a relatively hard, U-shaped band type such as that shown in FIGS. 1 and 2. In FIG. 1, reference symbol A denotes a goggle section; B denotes a supporting section (elastic body); C, D, and E denote supporting points; G denotes a speaker; and H denotes a cable.

The display mounting means of the helmet type has the problem that the observer's head is enclosed and becomes hot and stuffy in the helmet, in addition to the facts that the mounting and dismounting of the display device are troublesome and an oppressive sensation is greatly excited to the observer's head. The means of the eyeglass type, although easier in mounting and dismounting, encounters the problem that most of the weight of the display device is carried by the observer's nose, and thus a mounting sensation is extremely disagreeable. Further, the headphone type is also easier in mounting and dismounting, but has the problem that since the display device is supported by only two supporting points at the ears, a ballast section is required to hold the balance of the entire display device with respect to the weight of an eyemask section, with a resulting increase in total weight. A common headband type is such that if the eyemask section (corresponding to a display body in the present invention and hereinafter referred to as a goggle section) is heavy in weight, the pressure of the band becomes high and thus renders a mounting sensation disagreeable. The U-shaped band type requires relatively strong, resilient clamping forces at two, of the three supporting points, located on both sides of the observer's head from the temples to the occiput to steadily support the display device. Consequently, the problem is encountered that the observer suffers from a headache.

Further, a display disclosed in U.S. Pat. No. 5,208,449 has a holding member of horse's hoof shape constructed integral with headphones as holding means relative to the head, extending from the ears of the observer through the temples to the crown of the head, and for adjustment of the display to various head shapes of observers, uses a mechanism in which the headphones are slid vertically. The holding member does not have any cushion and comes in direct contact with the observer's head. Moreover, electrical equipment for image processing is incorporated in a case secured on the surface of the holding member.

This display, which is constructed as mentioned above, is held in a plane with respect to the observer's head, and hence lacks a holding force exerted in a direction perpendicular to the observer's face. As a result, the display is shifted in this direction, and cannot assure mounting stability. The adjustment of the display to the shape of the observer's head is such that the headphones are slid vertically, and thus where the position of each ear of the observer and the size of the head are not adjusted to the display, either of them must be sacrificed. Furthermore, although the display accommodates the position of the ear in a vertical direction, it cannot be entirely adjusted in a lateral direction. Since the adjustment is made by the observer after the mounting, the mechanism in which the headphones are slid vertically causes extreme deterioration in mounting stability. As a result, the observer must hold the holding member with his hand to make adjustment on each side of the display. Such adjustment is very difficult and troublesome.

Because the holding member is in direct contact with the observer's head, the observer feels a pain on his head when the display device is mounted. This causes a queer sensation and is uncomfortable. Moreover, since the electrical equipment is housed in the case secured on the surface of the holding member, cords for transmitting image and sound signals processed by the electrical equipment to an image display element and a speaker must be exposed onto the surface of the holding member. This situation ruins the appearance of the display device and brings about the danger that the cords are damaged, for example, by a shock from the outside.

SUMMARY OF THE INVENTION

It is, therefore, an object of the present invention to provide a head mounted image display which has mounting stability, follows closely the movement of the observer's head, causes comfortable mounting sensation, and is easy in operation of mounting and dismounting.

According to one aspect of the present invention, the head mounted image display includes a body having image display sections and optical systems, and a supporting section for fixing the body in front of the observer's eyes so that the image display sections can be viewed with the eyes. The supporting section has a plurality of supporting points which do not lie on the same plane with respect to the head.

Further, the supporting section includes a supporting frame structure connecting a plurality of supporting points which do not lie on the same plane with respect to the head.

Still further, the supporting section has an annular supporting frame structure with respect to the head so that the rear end of the supporting frame structure is positioned behind the crown of the head.

According to another aspect of the present invention, the head mounted image display includes a display body having image display elements for displaying images and eyepieces for conducting the images to the observer's eyes, and a holding member extending from the display body to cover at least one part of the observer's head so that the display body can be held in regard to the observer's face. Expansion bands are provided inside the holding member.

The holding member includes a right-hand holding section extending from the right-hand end of the display body and covering the right-hand temple of the observer and a left-hand holding section extending from the left-hand end of the display body and covering the left-hand temple of the observer. Inside the holding member is disposed a band with an adjusting member which has a length-adjusting mechanism whose one end is joined to the right-hand holding section and the other is joined to the left-hand holding section.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 17A is a side view for explaining the display of the ninth embodiment;

FIG. 17B is an enlarged view showing a speaker support used in the display of the ninth embodiment;

FIG. 17C is a sectional view taken along a line I—I in FIG. 17B;

FIG. 20A is a side view showing the head mounted image display of a tenth embodiment in the present invention;

FIGS. 20B, 20C, and 20D are views showing the details of a rear plate and a rear cover used in the display of the tenth embodiment;

DETAILED DESCRIPTION OF THE PREFERRED EMBODIMENTS

The head mounted image display of the present invention is preferably supported on the observer's head at four points. In this case, it is desirable that two supporting points are located adjacent to the observer's ears and the remaining two supporting points is such that one thereof is positioned at the sinciput, preferably at the forehead, and the other is positioned behind the crown of the head. In this way, the former two points serve to push the display downward against upward forces by which the display is dismounted, and the latter two points serve to share a load due to the gravity of the goggle section.

Consequently, the observer feels a slight sensation of mounting and complete stability can be secured. Furthermore, since the occiput is not provided with the supporting points, namely, the frames and pads, the observer can easily move his head, and when sitting on a chair to use the display, he need not care about contact with the back or headrest of the chair and feels very comfortable. The operation for mounting and dismounting the display on and from the head is the same as the case where a mask is used, and thus is extremely simple.

Furthermore, the headband of the display is adjusted to the shapes of the heads of observers which vary according to sexes, ages, and races, thereby bringing about good mounting performance suitable for various observers.

In accordance with the embodiments shown, the present invention will be explained in detail below.

First Embodiment

Figure 3:
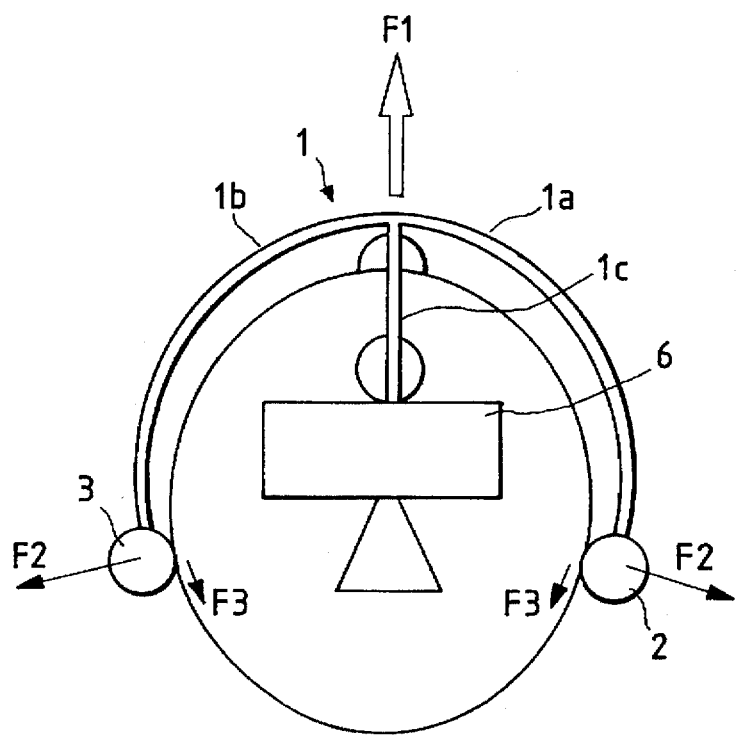
FIG. 3 is a front view schematically showing the case where the head mounted image display of a first embodiment in the present invention is mounted on the observer's head.
Figure 4:
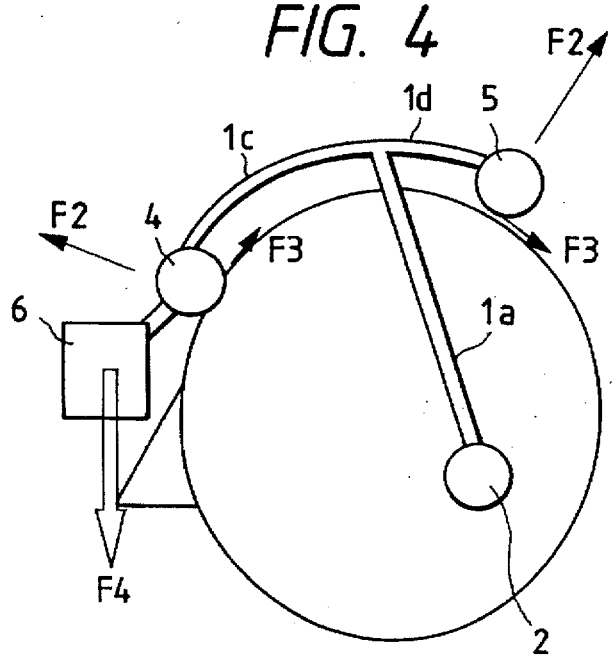
FIG. 4 is a side view in FIG. 3.

When the display is mounted on the head in this embodiment, as shown in FIGS. 3 and 4, a supporting section 1 has an elastic supporting frame structure which is separated front-to-back and right-to-left from a portion close to the crown of the head. As shown in FIG. 3, when viewed from the observer side, a left-hand pad 2 and a right-hand pad 3 are provided at the tips of a left-hand frame 1a and a right-hand frame 1b, respectively, and the supporting points of the pads 2 and 3 on the head are located at positions adjacent to the ears, preferably positions slightly shifted toward the occiput. The frames 1a and 1b are biased by an elastic force so as to diminish the distance between the pads 2 and 3, and are constructed of flexible material, for example, synthetic resin in order to prevent the biasing force from exciting an oppressive sensation through the pads 2 and 3 in the vicinities of the supporting points. In the mounting state in FIG. 3, if an upward force $F_1$ by which the display of the first embodiment is dismounted from the head is applied to the display, a greater opposing force $F_2$ will be created between each of the pads 2 and 3 and the head, and thus a downward frictional force $F_3$ will be exerted, making it hard to remove the display. In this way, the display is maintained in a stable mounting state.

As shown in FIG. 4, the supporting section 1 in the first embodiment is further provided with a front pad 4 for a front frame 1c and a rear pad 5 for a rear frame 1d, which constitute two supporting points for clamping the crown of the head front-to-back. The front frame has a goggle section 6 ahead of the front pad 4. The goggle section 6 is equipped with image display sections and optical systems, which constitute a body section in the head mounted image display of the present invention. In this way, if a gravity $F_4$ of the display is concentrated in the goggle section 6, the opposing force $F_2$ and the frictional force $F_3$ will act on each of the pads 4 and 5 to share the load. As a result, the mounting state where a mounting balance is good and stable is secured. The front pad 4 may be located at any position of the sinciput, but, in order to bring about a more stable mounting state, it is desirable that the pad 4 is located at the forehead.

As mentioned above, since the first embodiment is designed so that the display is carried by four pads, namely four supporting points which do not lie on the same plane, the load of the display is shared and frictional forces are increased. In particular, the share of the load causes a slight sensation of mounting, and the four supporting points assure complete stability. Because the occiput is not provided with any frame and pad and has a wide open area, the observer is quite comfortable when sitting in a chair with a headrest or a high back to use the display. Owing to the open area, the observer need not wear the display from above his head as in a helmet and can readily mount it on his head, even with his glasses on, in such a manner as to wear a mask on his face. Furthermore, since the number of contacts with the head at the supporting points is kept to a minimum, a soothing sensation is cause when the display is mounted, and there is no stuffiness due to the body heat and sweating.

Second Embodiment

Figure 5:
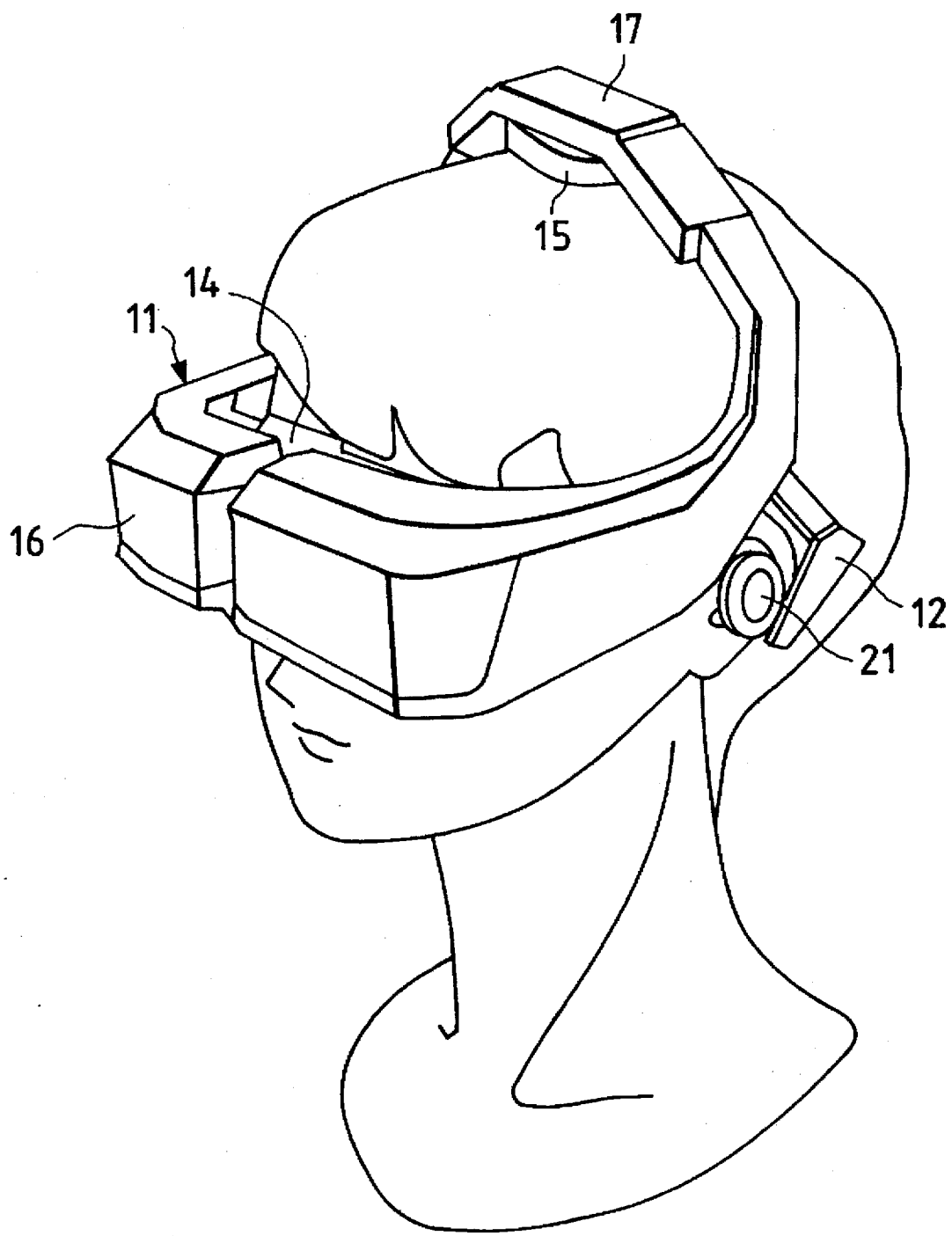
FIG. 5 is a perspective view showing the case where the head mounted image display of a second embodiment in the present invention is mounted on the observer's head.
Figure 6:
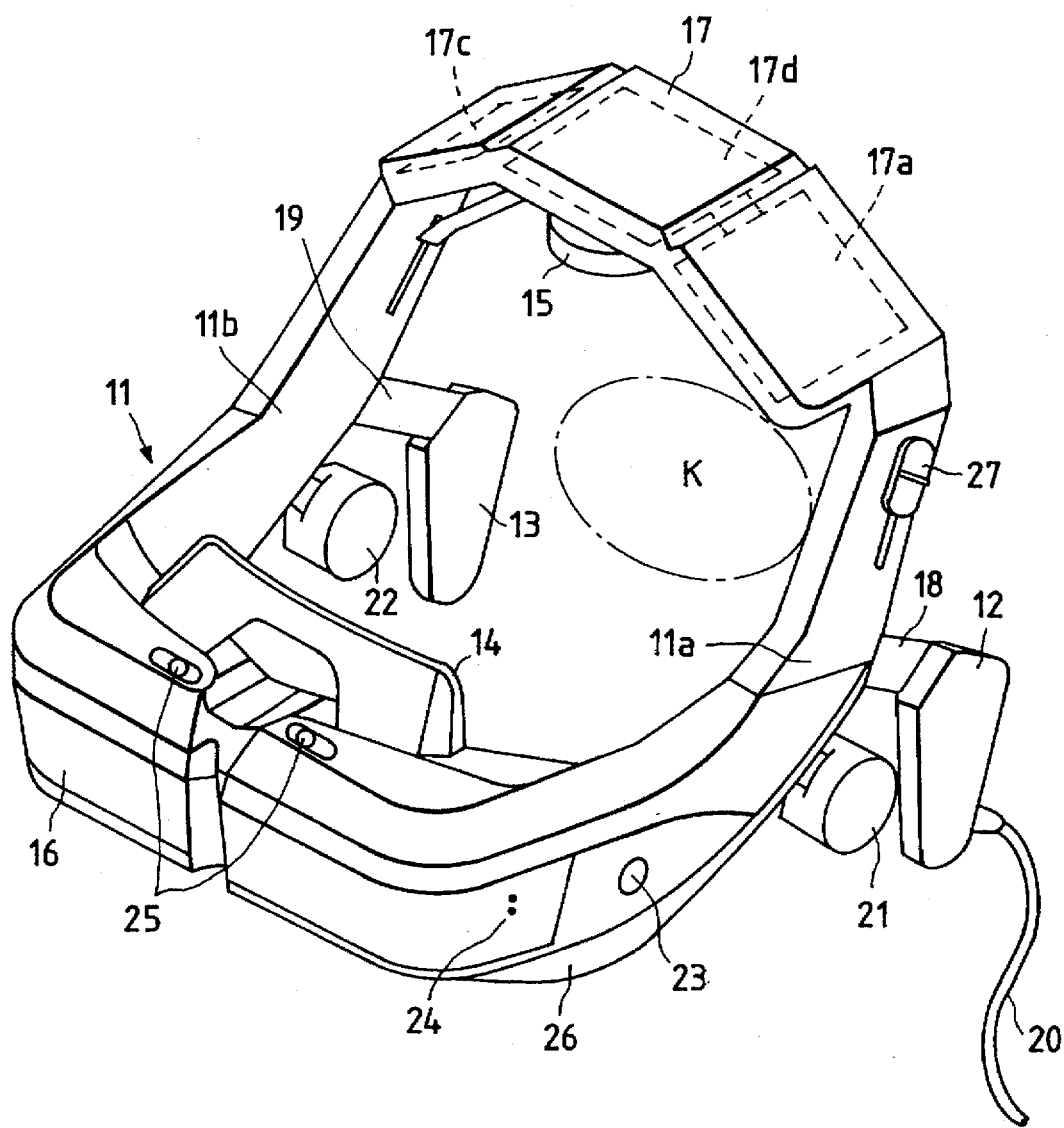
FIG. 6 is a perspective view showing the head mounted image display of the second embodiment.
Figure 7:
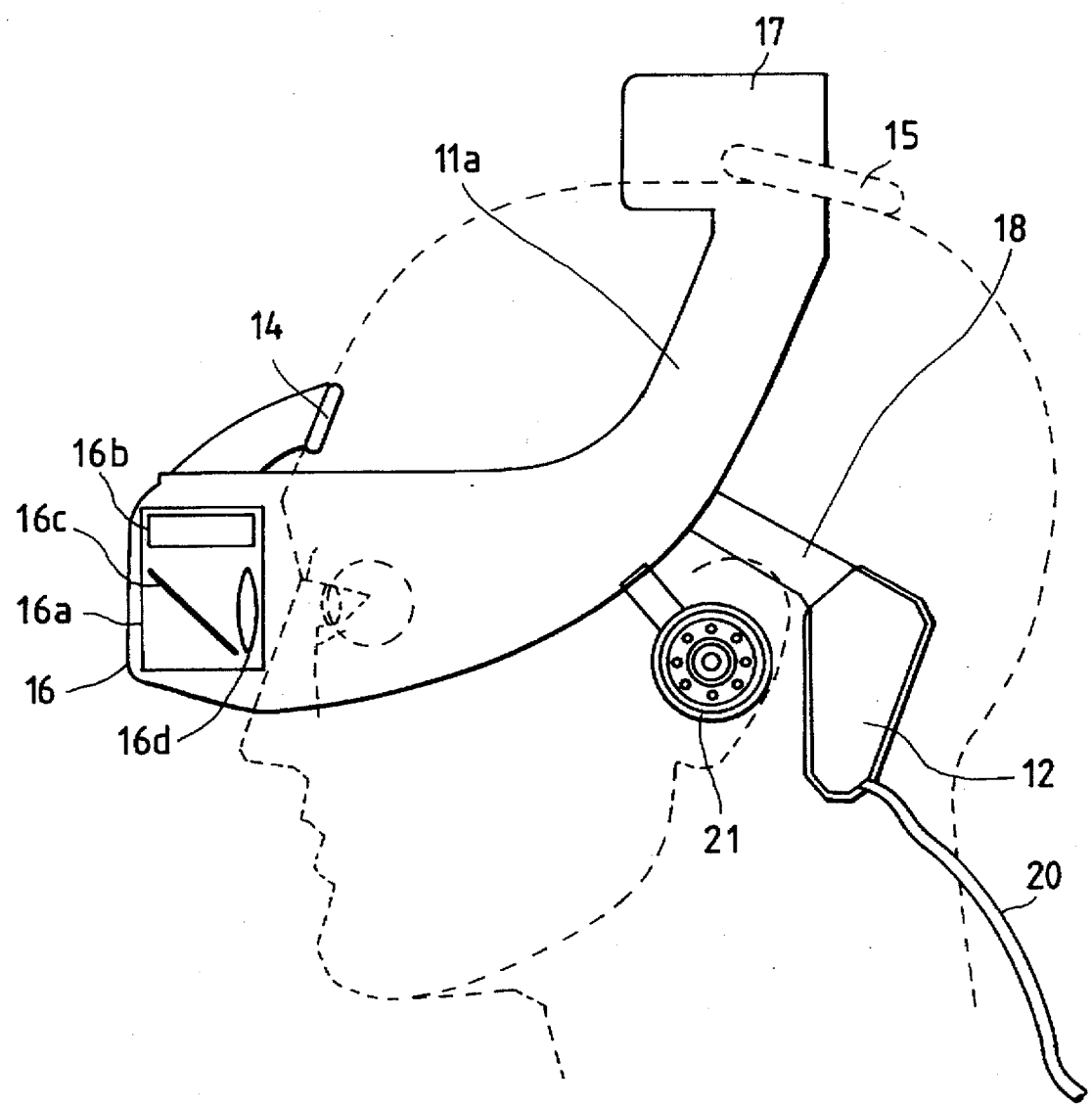
FIG. 7 is a side view for explaining the display of the second embodiment.

As shown in FIGS. 5 to 8, a supporting section 11 in this embodiment has a closed structure including a left-hand frame 11a and a right-hand frame 11b, viewed from the observer side, each having the shape of a 'J', followed by a goggle section 16 connecting these frames and a crown band section 17. The left-hand frame 11a and the right-hand frame 11b are provided with a left-hand pad 12 and a right-hand pad 13 through supporting frames 18 and 19, respectively, consisting of elastic materials. The supporting frames 18 and 19 are screwed to the left-hand frame 11a and the right-hand frame 11b, respectively, and a cable 20 is connected to the left-hand pad 12. Speakers 21 and 22 are attached to the left-hand frame 11a and the right-hand frame 11b, respectively, to the positions of the ears. Image and sound signals sent by the cable 20 are transmitted, through the pad 12, the supporting frame 18, and the left-hand frame 11a, to image display sections incorporated in the goggle section 16 and the speakers 21 and 22. The image display sections and optical systems incorporated in the goggle section 16 are available in various types, and an example thereof is shown in FIG. 7. In this figure, which shows only a half of the goggle section 16, reference numeral 16a represents a lens barrel; 16b an LCD; 16c a mirror; and 16d an eyepiece.

The goggle section 16 is provided with a mode changeover switch 23, a mode indicating lamp 24, and interpupil distance adjusting knobs 25. At the upper and lower positions of the goggle section 16, a front pad 14 and face pads 26 are provided. The face pads 26 are mainly adapted to bring about a light-blocking effect. The crown band section 17 is divided into three blocks and is designed to have some degree of flexibility between the blocks, which incorporate electronic substrates 17a, 17b, and 17c loaded with voltage adjusting circuits required for color adjustment.

Figure 8:
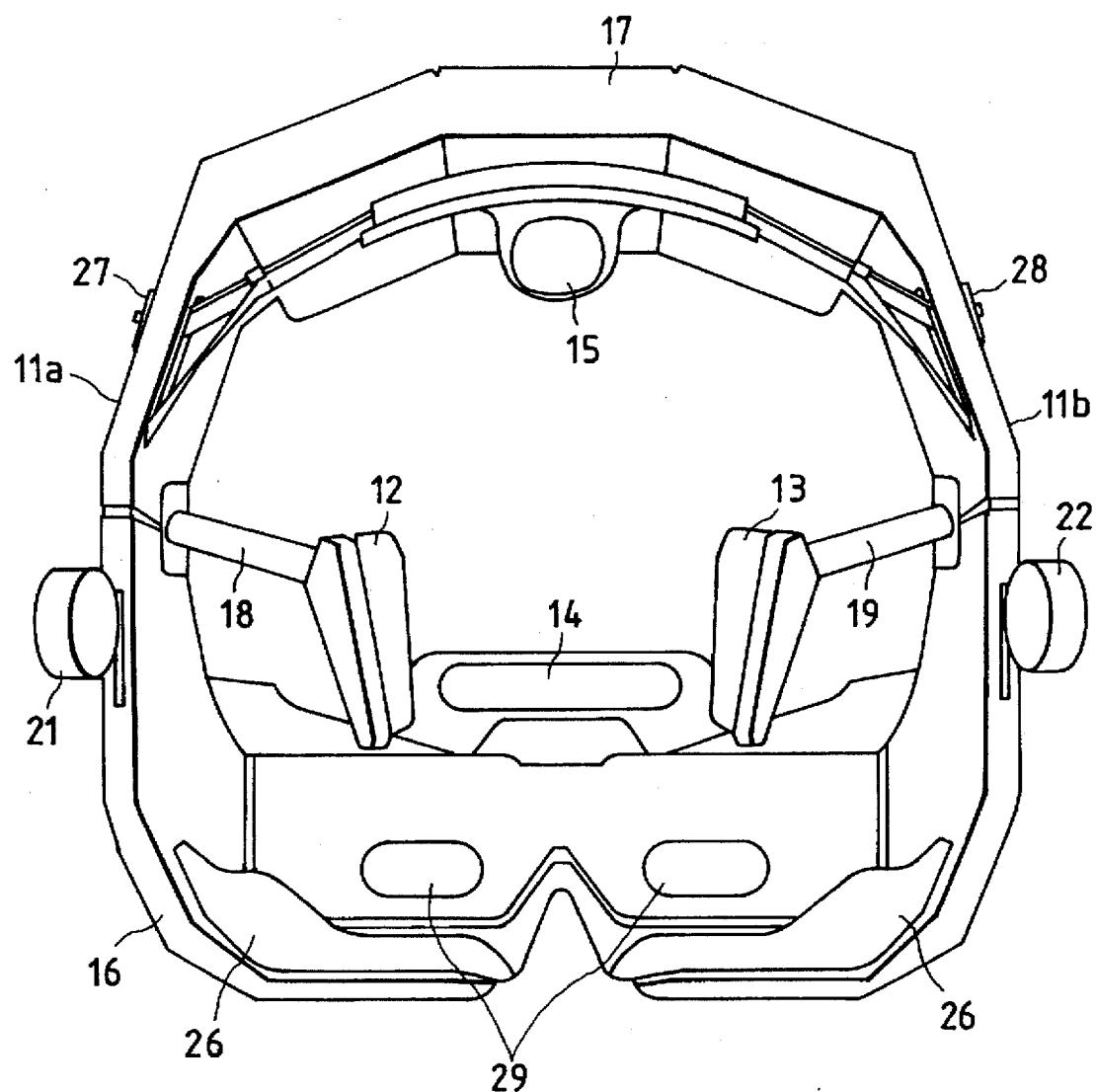
FIG. 8 is a bottom view showing the display of the second embodiment.

A rear pad 15, as shown in FIG. 8, is placed inside the crown band section 17 so that its vertical position can be adjusted according to the shapes of the heads of individuals by height knobs 27 and 28 attached to the frames 11a and 11b. The pad 15, as shown in FIG. 5, may of course be attached directly to the lower side of the crown band section 17. Since the second embodiment is constructed as mentioned above, a portion corresponding to the occiput, as indicated by a chain line in FIG. 6, is occupied by an open area K. In this way, the supporting section 11 in the second embodiment has the supporting frame structure connecting the four supporting points of the pads 12, 13, 14, and 15. Any of these pads has moderate elasticity and flexibility and is constructed of such material as to cause great friction to the head. In FIG. 8, reference numeral 29 represents eyepiece windows.

To mount the display of the second embodiment on the head, it is only necessary to spread out the pads 12 and 13 while holding the frames 11a and 11b with hands and to place the display on the head from the front side in such a manner as to wear a mask. Subsequently, the position of the rear pad 15 is adjusted to the shape of the head of the observer by the height knobs 27 and 28. As a result, the total weight of the display is shared and carried by the pads 14 and 15. The pads 12 and 13 press the rear potions of the ears toward the center of the head by means of the elasticity of the supporting frames 18 and 19. In this way, the four pads 12, 13, 14, and 15 are arranged so that the head is covered by the four supporting points which do not lie on the same plane, and hence press the head in a direction nearly perpendicular to the surface thereof to always maintain a stable mounting state.

Figure 1:
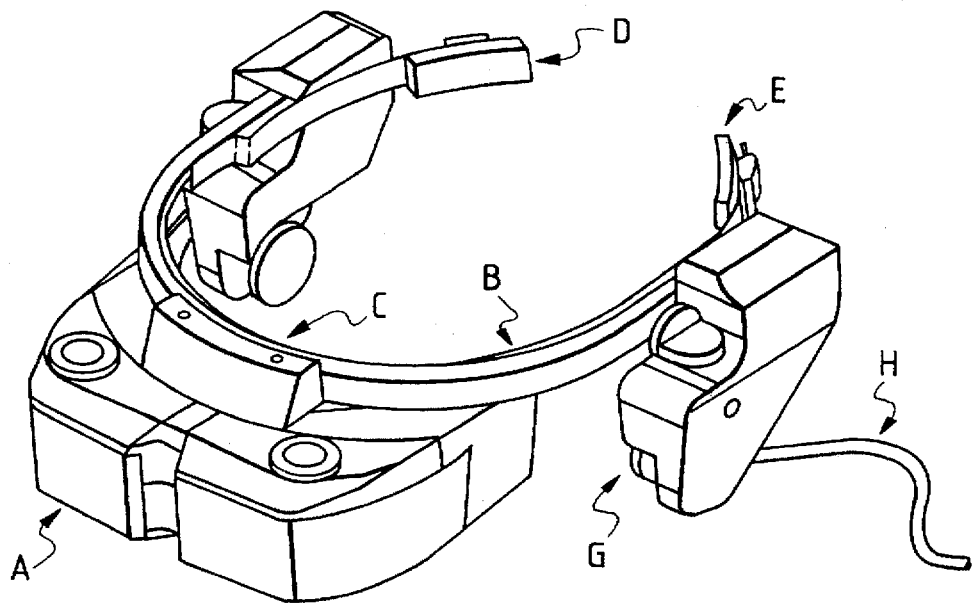
FIG. 1 is a perspective view showing a prior art head mounted image display.
Figure 2:
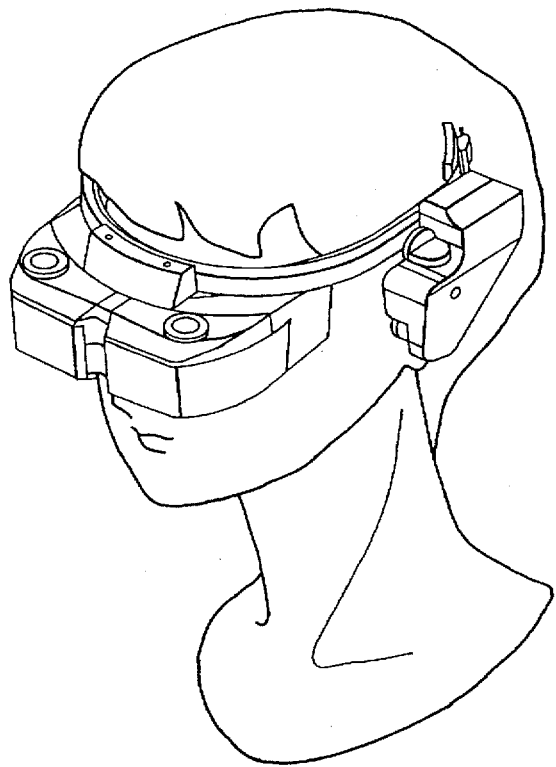
FIG. 2 is a perspective view showing the case where the display of FIG. 1 is mounted on an observer's head.

Thus, in the second embodiment, the supporting section 11, which has a closed annular supporting frame structure as a whole, is excellent in rigidity compared with the conventional U-shaped band type display shown in FIG. 1 and is intended for lightweight design accordingly. In addition, the effects described in the first embodiment hold for the case of the second embodiment.

Third Embodiment

Figure 9:
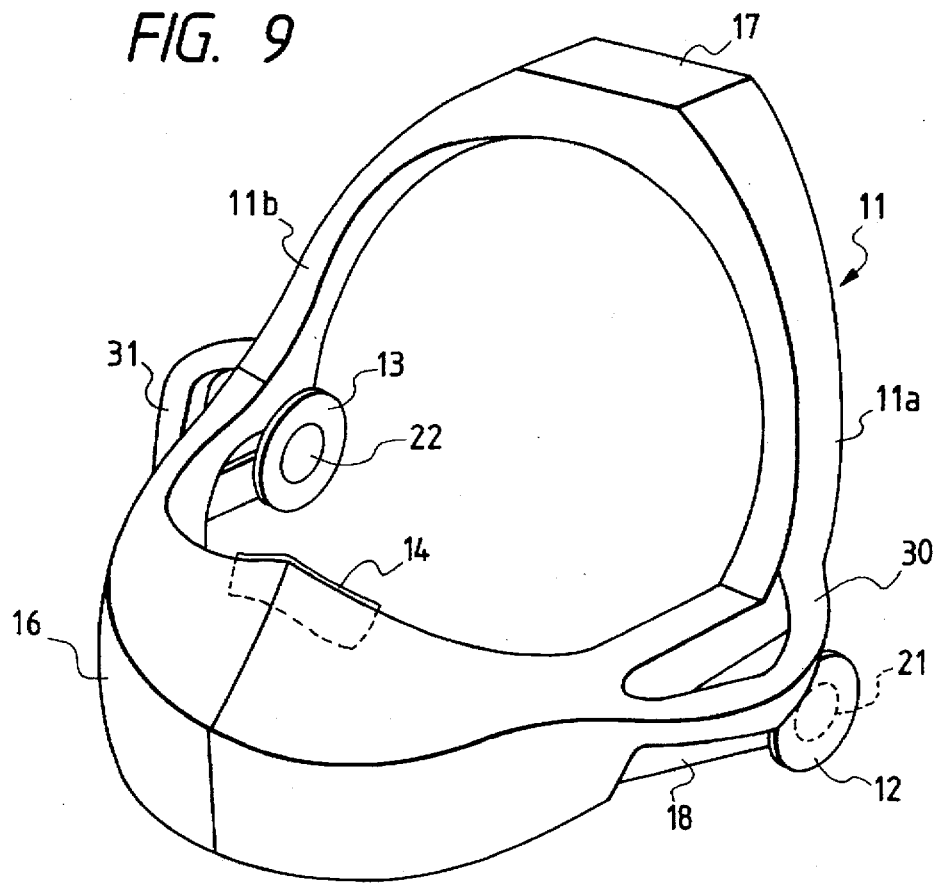
FIG. 9 is a perspective view showing the head mounted image display of a third embodiment in the present invention.

This embodiment, as shown in FIG. 9, is very similar to the second embodiment, and thus like numerals are used to elements having identical functions. The third embodiment is the same as the second embodiment with the exception that the pads 12 and 13 have such shapes as to surround the speakers 21 and 22 as in the muffles of the headphones and press the peripheries of the ears, and that the frames 11a and 11b are provided with holding grips 30 and 31. The holding grips 30 and 31 may be constructed integral with the frames 11a and 11b, respectively, or may be fixed with screws or an adhesive. Also, it is needless to say that the rear pad 15, although it is not specified in FIG. 9, is placed on the lower side of the crown band section 17.

In the third embodiment constructed as mentioned above, the holding grips 30 and 31 have the effect of reinforcing the frames 11a and 11b. Moreover, when the display is mounted and dismounted or carried, the holding grips will inevitably be held, and thus little force is applied to other portions. Consequently, it is avoided that the goggle section and the speakers are damaged or contaminated. Furthermore, since it is not required that the strength of the other portions is made so high, the total weight of the display can be lessened. In addition, the function and effect described in the second embodiment, although their explanations are omitted to avoid repetition, also hold for the case of the third embodiment.

Fourth Embodiment

Figure 10:
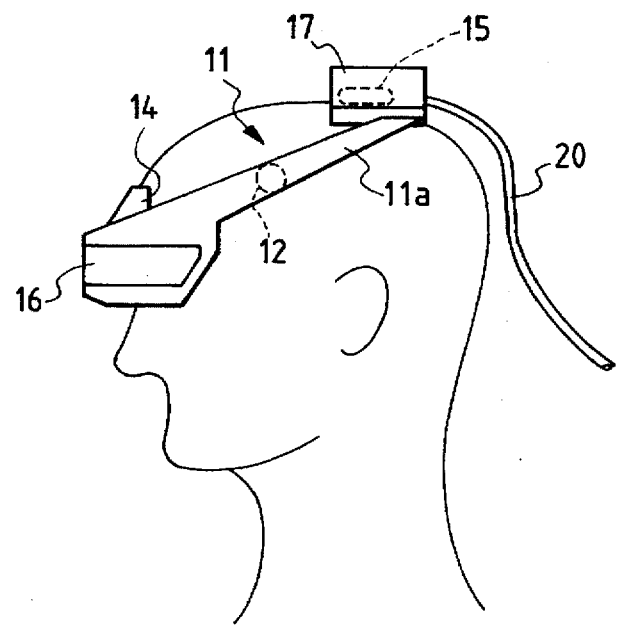
FIG. 10 is a side view showing the case where the head mounted image display of a fourth embodiment in the present invention is mounted on the observer's head.

The fourth embodiment illustrated in FIG. 10 is such that the supporting section 11 is actually shaped into an annular form. The front pad 14 is placed on the sinciput, the rear pad 15 is provided on the lower side of the crown band section 17 at the position behind the crown of the head, and the left-hand pad 12 is disposed inside the left-hand frame 11a. Of course, the right-hand frame 11b, not shown, is provided with the right-hand pad in the fourth embodiment, the cable 20 for receiving the image signal is connected to the crown band section 17.

Fifth Embodiment

Figure 11:
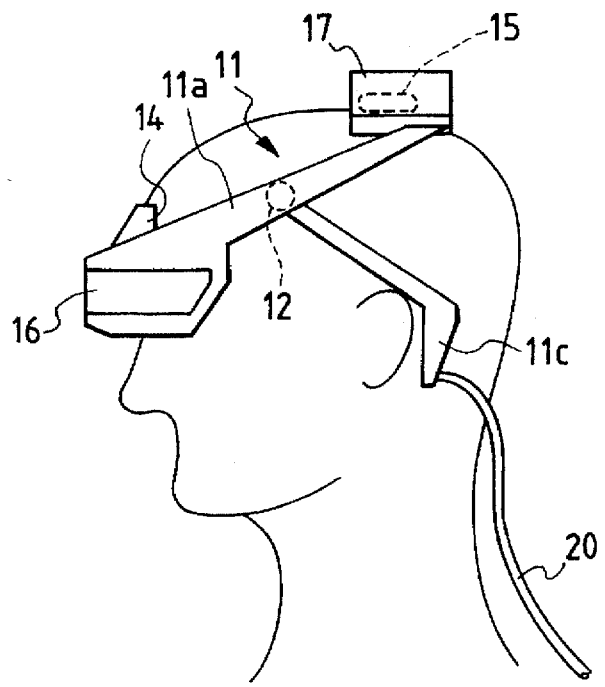
FIG. 11 is a side view showing the case where the head mounted image display of a fifth embodiment in the present invention is mounted on the observer's head.

The fifth embodiment shown in FIG. 11 provides the left-hand frame 11a with a supporting arm 11c, in addition to the construction of the fourth embodiment. The cable 20 is connected to the supporting arm 11c. Such a supporting arm may be further provided to the right-hand frame 11b. Moreover, a pad may also be provided inside the supporting arm 11c so that it is located behind the ear. The fifth embodiment has the advantage that the cable 20 is hard to touch the occiput compared with the fourth embodiment.

Sixth Embodiment

Figure 12:
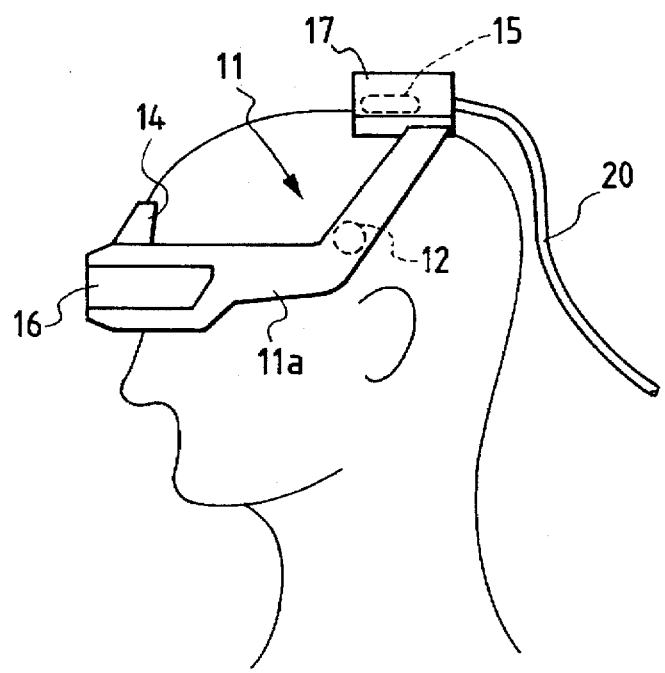
FIG. 12 is a side view showing the case where the head mounted image display of a sixth embodiment in the present invention is mounted on the observer's head.

This embodiment depicted in FIG. 12 is such that the frame 11a is shaped into a curved form having a bend, although that of the fourth embodiment in FIG. 10 is apparently straight. When the supporting section 11 of the display has such an annular shape with bends, the center of gravity of the display can be made lower than in the fourth embodiment. This increases stability and strength, and facilitates the layout of the speakers.

Seventh Embodiment

Figure 13:
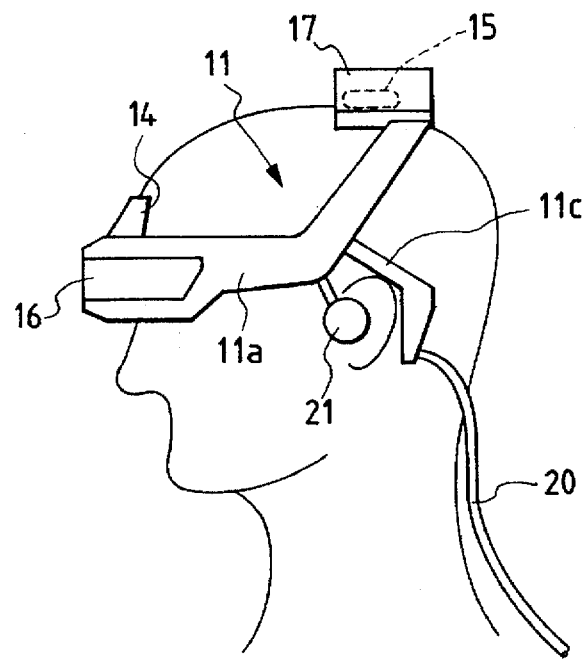
FIG. 13 is a side view showing the case where the head mounted image display of a seventh embodiment in the present invention is mounted on the observer's head.

This embodiment shown in FIG. 13 provides the left-hand frame 11a with the supporting arm 11c and the speaker 21, in addition to the construction of the sixth embodiment. To receive the image and sound signals, the cable 20 is connected to the supporting arm 11c. Moreover, the right-hand frame 11b, not shown, may be provided with such a supporting arm or the speaker 22 as already described.

Eighth Embodiment

Figure 14:
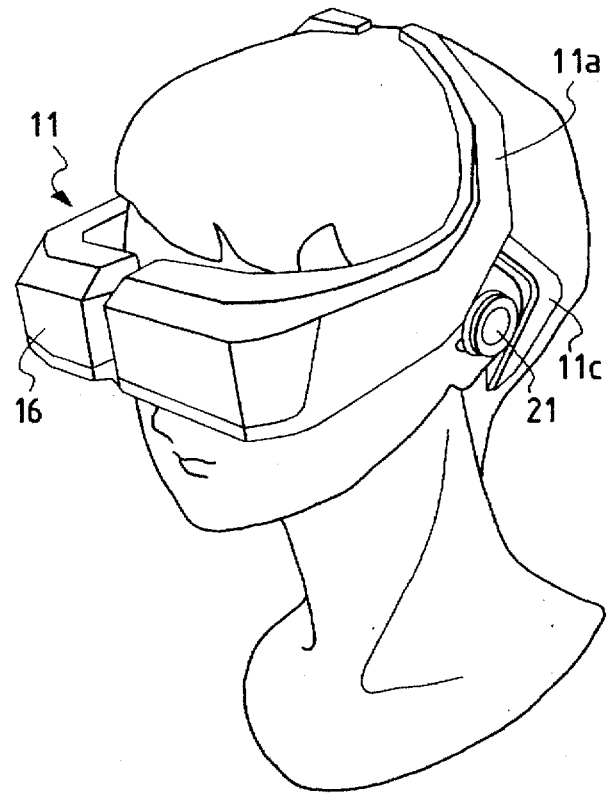
FIG. 14 is a perspective view showing the case where the head mounted image display of an eighth embodiment in the present invention is mounted on the observer's head.

The eighth embodiment depicted in FIG. 14 is such that the middle part of the crown band section 17 is practically removed from the construction of the seventh embodiment. Thus, in the eighth embodiment, the electronic substrates 17a, 17b, and 17c shown in FIG. 6 are loaded in another place. The crown band section 17 is divided into two, and thereby the rear pad 15 is also separated. In this way, the display is carried by at least five pads, that is, at five supporting points. Furthermore, the division of the crown band section 17 enables the supporting section 11 to have elasticity, thus doing away with the need for making adjustment according to the shapes of the heads of individuals.

Ninth Embodiment

Figure 15:
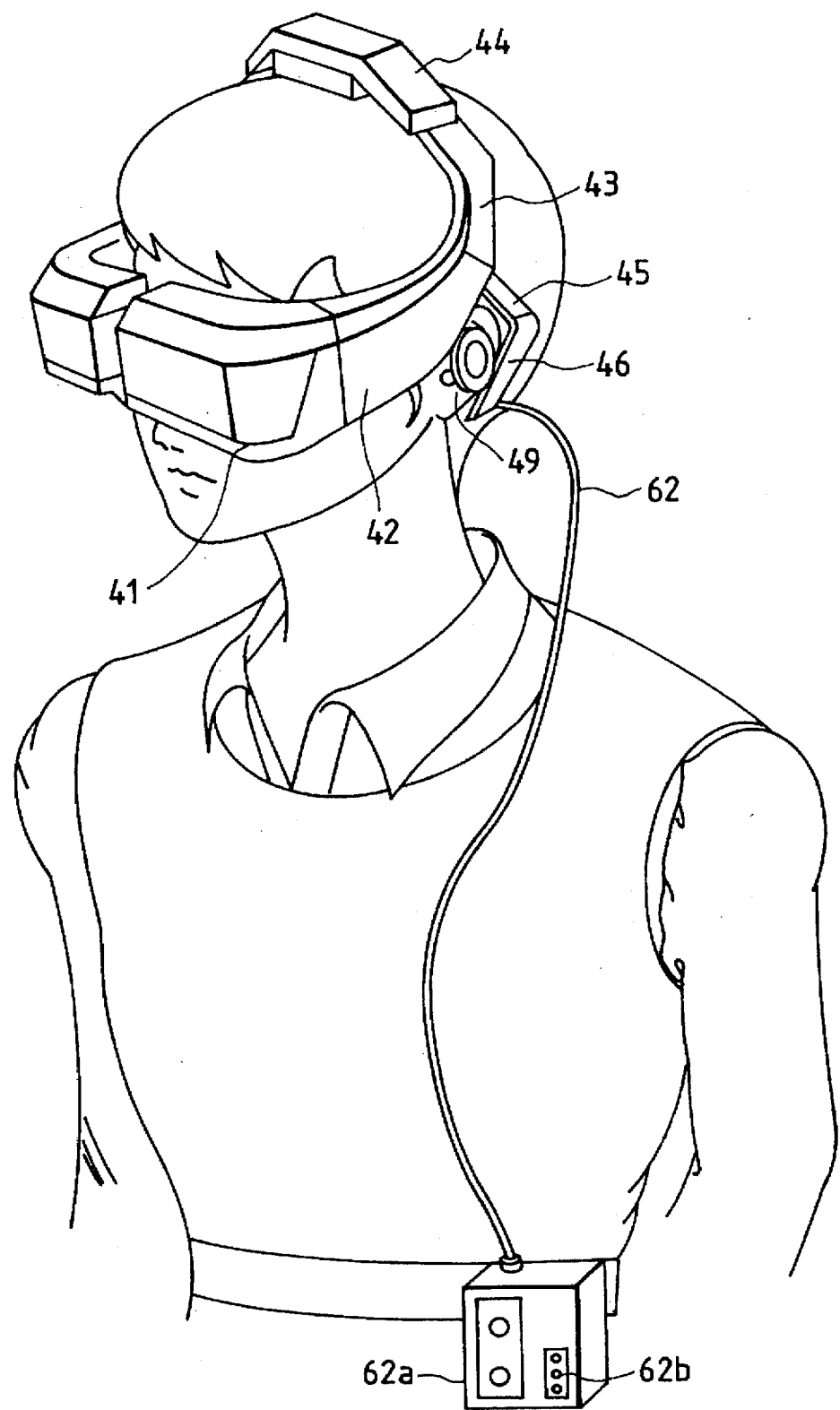
FIG. 15 is a general view showing the case where the head mounted image display of a ninth embodiment in the present invention is mounted on the observer's head.

In FIG. 15, a display body section 41 is fixed through the head by a supporting member so that it is held on the face of the observer. The supporting member comprises left- and right-hang front frames 42, each one end of which is joined to the display body section 41, extending from the temples to the upper portions of the ears of the observer; left- and right-hand rear frames 43, each joined to the other end of each front frame 42, extending to the occiput of the observer; and a crown frame 44, both ends of which are joined to the rear frames 43 so as to interpose between them, holding the crown of the head of the observer.

Rear plates 45 constructed with elastic bodies, for example, metal plate springs, are each joined to the supporting member in the vicinity of the connection between the front frame 42 and the rear frame 43. Each rear plate 45 is such that a rear cover 46 acting as a part of the supporting member is located behind the ear in the area ranging from the occiput to the nape of the neck of the observer and can support the display.

Figure 16A:
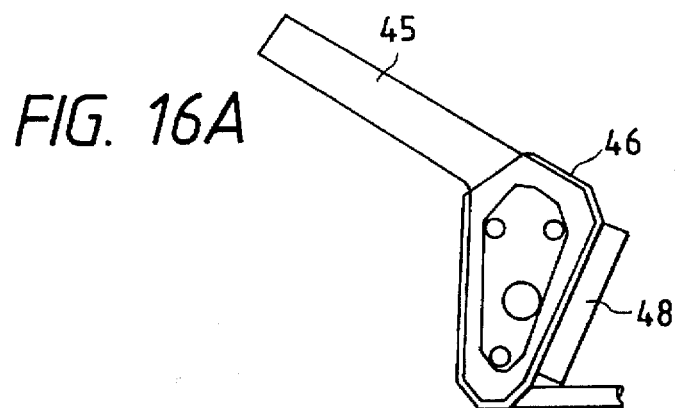
FIGS. 16A, 16B, and 16C are views showing the details of a rear plate and a rear cover used in the ninth embodiment.
Figure 16B:
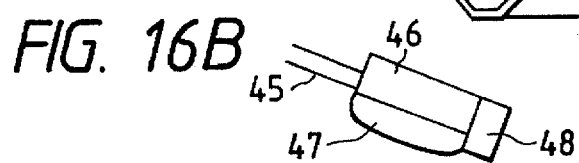
Figure 16C:
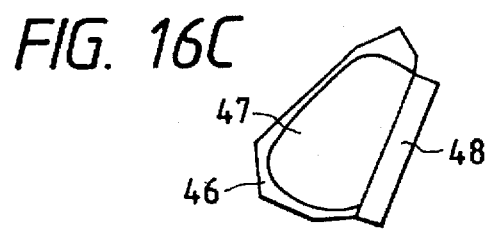

FIG. 16A shows the details of the rear plate 45 and the rear cover 46. FIG. 16B is a side view of the rear cover 46 and FIG. 16C depicts the back surface of the rear cover 46. This back surface (a surface coming in contact with the observer to support the display body section 41) is provided with a rear pad 47 made of foamed urethane with a foam density of 20–60, preferably 30–50, and a compression rate of ½–⅓, preferably ⅓ or less. This pad can be substituted by an elastic member such as a sponge, felt, or rubber. The face of the rear cover 46 opposite to the rear plate 45 is provided with a finger holder 48 consisting of a flat plate made of hard rubber.

A speaker 49 for transmitting a sound to the observer, as shown in FIG. 17A, is connected to the front frame 42 through a speaker support 50, one end of which is joined to the front frame 42 and the other to the speaker 49. As in FIG. 17B showing the back surfaces of the speaker 49 and the speaker support 50, the speaker 49 includes a speaker cover 49a and a sponge cover, or a metallic cover 49b, incorporating a sound output section. The speaker support 50 has a length of 30–100 mm, preferably 40–80 mm, from a supporting point P which is a connection with the front frame 42 to the center of the speaker 49, and is designed to be rotatable at an angle of rotation θ=120° at a maximum, preferably 60°–80°, with the supporting point P as a center. The shape of the supporting point of the speaker support 50 is not necessarily limited to a circle. If, for example, a long slot is cut along the longitudinal direction of the speaker support 50 and is connected to the front frame 42 at one point, the distance between the speaker 49 and the supporting point can freely be increased or reduced.

A speaker cord 51 for transmitting the sound signal to the speaker 49, as illustrated in FIG. 17C, is embedded in a U-shaped groove 50a provided on the inside of the speaker support 50. The groove 50a is bent into a Y-shape close to the supporting point P at an angle α=90°, preferably 60°–80°, to lay on the cord 51 inside the front frame 42 or the rear frame 43.

The display body section 41, as depicted in FIG. 17A, includes, on each side thereof, a liquid crystal display element (LCD) 52, a prism 55 having a half mirror 53 at its interface and a concave reflecting mirror 54 on the bottom, and a liquid crystal shutter 56. Because of this optical arrangement, an image derived from the LCD 53 is projected on the retina of the observer's eye by the eyepiece action of the prism 55. For incidence or block of incoming light, the liquid crystal shutter 56 is used and electrically opened and closed. An image cord (not shown) for transmitting the image signal to the LCD 52 is embedded inside the front frame 42 from the display body section 41.

Figure 19:
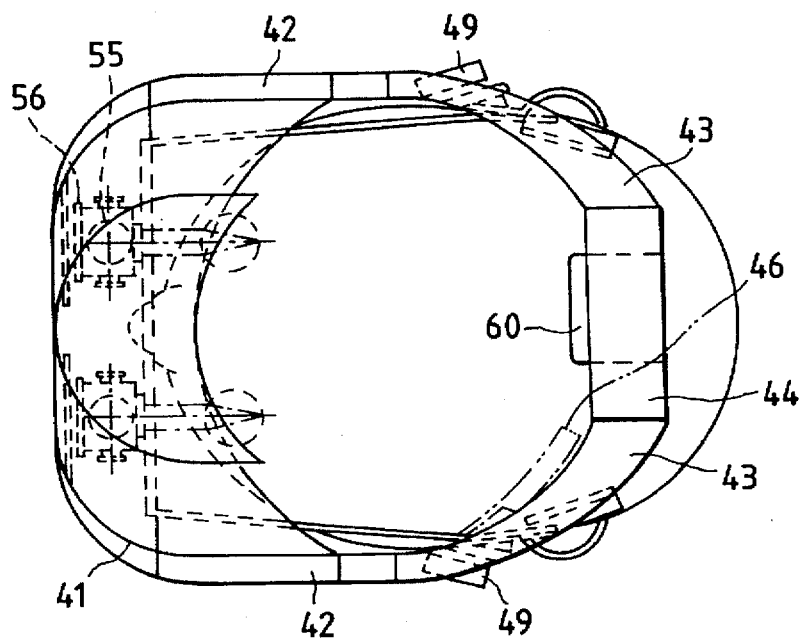
FIG. 19 is a plan view showing the display of the ninth embodiment.
Figure 18A:
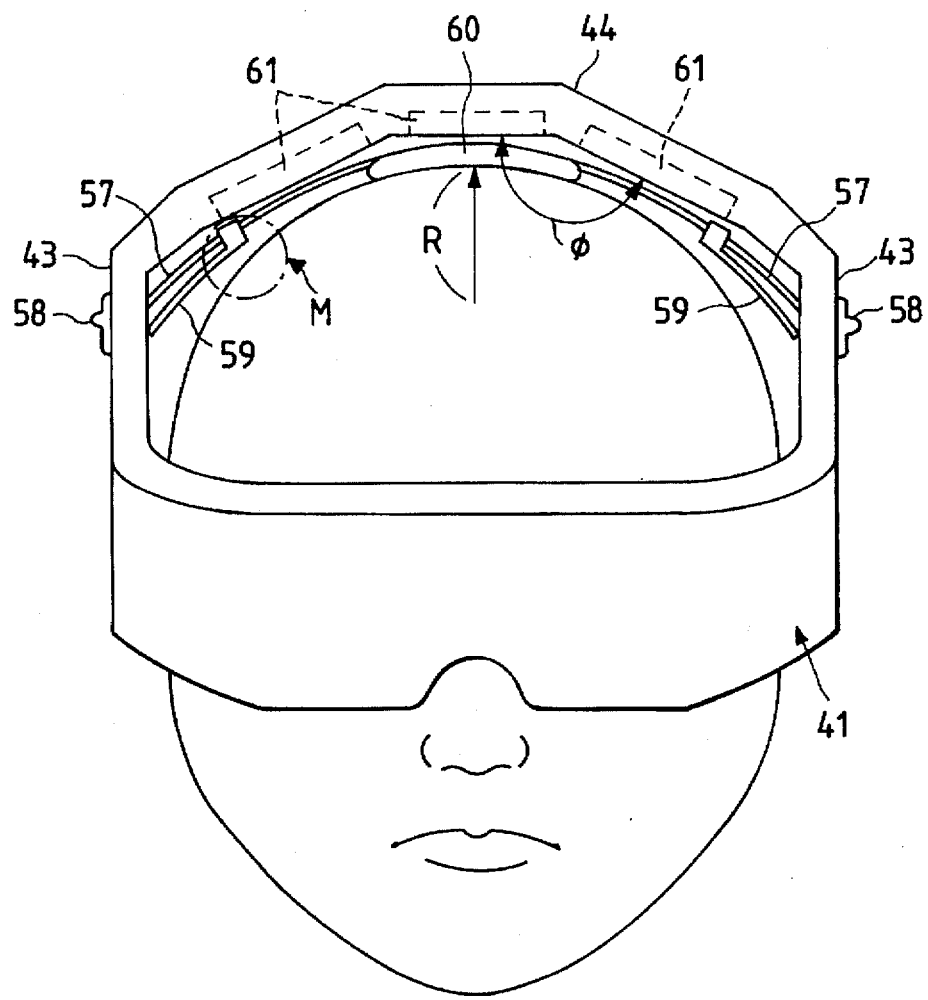
FIG. 18A is a front view showing the display of the ninth embodiment.
Figure 18B:
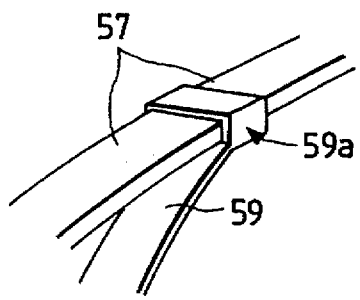
FIG. 18B is an explanatory view showing a head band used in the display of the ninth embodiment.
Figure 18C:
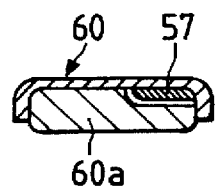
FIG. 18C is a sectional view showing the detail of a crown cover used in the display of the ninth embodiment.

The front frame 42 is joined to the rear frame 43 by connecting members (not shown), such as screws. Both frames may be integrally constructed. On the inside of the rear frame 43, each of left- and right-hand bands 57 shown in FIG. 18A is provided and constructed so that its stroke can be adjusted by an adjusting member 58 protruding from the outside of the rear frame 43. As shown in 18B, each band 57 is provided with a plate 59, one end of which is fixed to the rear frame 43 and the other is constructed with an envelop section 59a which is slidable along the band 57 and has a closed structure. At one end of the band 57 opposite to the other connected to the rear frame 43, a crown cover 60 is mounted which has a curved form with a radius of curvature R=80–120 mm, preferably 50–150 mm, in the lateral direction of the crown of the head of the observer. The crown cover 60 may also have the radius of curvature R in the longitudinal or diagonal direction of the observer's head. In the case of the longitudinal direction, it is desirable that the crown cover 60 is curved at a radius of curvature R=180–220 mm, preferably at least 50 mm. Furthermore, the crown cover 60, as shown in 18C, is designed so that a crown pad 60a is placed to be movable through the band 57 on the inside thereof. The crown pad 60a is made of foamed urethane with a foam density of 20–60, preferably 30–50, and a compression rate of ½–⅓, preferably ⅓ or less. This pad can be substituted by an elastic member such as a sponge, felt, or rubber. FIG. 19 is a plan view of the display shown in FIGS. 17A and 18A.

The crown frame 44 is shaped into a polygon to the observer's head. For example, as shown in FIG. 18A, it is desirable that the crown frame 44 has a roof-like form in which an angle ø made by unit planes adjacent to each other is 140°–160°, preferably 100°–160°. In unit plane portions of the crown frame 44 shaped as mentioned above, electrical equipment 61, such as image and sound signal processing circuits, is distributed and incorporated. In order to send the image and sound signals processed by the electrical equipment 61 to the LCDs and the speakers, the electrical equipment 61 is electrically connected through the rear frames 48 and the front frames 42 to the speaker cord 51 and the image cord not shown.

A cable 62 for transmitting the image and sound signals to be basically processed from the outside to the electrical equipment 61, as shown in FIG. 17A, is such that its one end is connected to the electrical equipment 61 and the other projects into the outside from the rear end of the rear cover 46 through the insides of the crown frame 44, the rear frame 43, the front frame 42, and the rear plate 45. The cable 62, as shown in FIG. 15, is connected to a video reproducing device 62a. In this figure, numeral 62b represents switch and volume control sections for the video reproducing device 62a.

The cable 62 may be designed so that its tip as a jack can be attached to the existing video deck. Further, it may be connected to a tuner for TV electric wave reception to watch TV, or may also be connected to a computer so as to receive the image of computer graphics or the message image from the computer. To remove the cord which is obstructive to the operation, an antenna may be provided to receive a signal from the outside through the electric wave.

Next, reference is made to the procedure where the observer mounts or dismounts the display of the ninth embodiment constructed mentioned above. First of all, the observer holds the finger holders 48 with the fingers of his hands to spread out the rear covers 46 so that a space between the rear plates 45 is increased and his head is easily inserted therein. The crown pad 60a and the display body section 41 are then adjusted to the head as a basis, and the fingers are released from the finger holders 48. Since the rear covers 46 is joined to the rear plates 45 consisting of elastic bodies, the rear plates 45 press and support the observer's head from the rear thereof by means of their restoring forces. Subsequently, images from the LCDs 52 in the display body section 41 or incoming light is taken as a basis, and the adjusting members 58 are moved vertically so that the positions of the observer's eyes coincide with the exit pupils formed by the prisms 55. By this operation, the bands 57 attached to the adjusting members 58 expand and contract, and the crown cover 60 cooperates therewith and moves up and down. In this way, the display body section 41 is moved vertically relative to the positions of the observer's eyes, and thus the position of the display body section 41 can be adjusted.

The speaker supports 50 are swiveled and thereby the speakers 49 can be adjusted to the positions of the observer's eyes. In order to dismount the display from the observer's head, it is only necessary to spread again the rear covers 46 with the finger holders 48. The operation of the mounting and dismounting can thus be performed easily and smoothly. Further, since the crown frame 44 is shaped into a roof-like form, a dead space is limited and compactness can be brought about. Still further, since each wire, such as the cable 62, is embedded in the frames, the damage of the wire from the outside can be minimized such that when a display, for example, with exposed cables, is left on a desk, the cables may be nipped between the display and the desk. In addition, the appearance of the display is not ruined, and hence the number of degrees of design freedom can be increased. The finger holders 48, which are made of rubber, have a non-slip effect.

Moreover, the U-shaped groove 50a of each speaker support 50 has the shape of the letter "Y". This forms a common part which can be used to either the left-hand speaker support or the right-hand speaker support. Thus, mass production is encouraged and compactness can be brought about. At the same time, the speaker cord 51 is embedded in the groove 50a of the speaker support 50, and thus when the speaker support 50 is swiveled, a stress applied to the intersection of the Y-shaped portion of the U-shaped groove 50a can be shared and the durability of the cord can be improved, because the angle α is acute.

Since the pads 47 and 60a are constructed of foamed urethane, a stress produced by pressure for supporting the head can be absorbed and shared, the pain of the head and a queer sensation caused by contact with the observer's head on mounting can be moderated, and a mounting sensation can be made favorable. Further, because of the curve of the crown cover 60, the stress can also be absorbed and shared by the crown pad 60a which is likewise curved, and a queer sensation caused to the crown of the observer's head can be further moderated.

Tenth Embodiment

This embodiment, as illustrated in FIG. 20A, is such that the rear plate 45 extends over both the front frame 42 and the rear frame 43. Consequently, the rear plate 45 is provided with a connecting plate 63 and is secured by screws to the front frame 42 and the rear frame 43 (refer to FIG. 20B). The display body section 41 incorporates the various optical elements 52, 53, 54, 55, and 56 and hence tends to increase in weight. The supporting force applied to the crown frame 44 will therefore be increased. Thus, the tenth embodiment is provided with an extension 64 that the crown frame 44 is extended toward the display body section 41 to improve the holding force. By the provision of the extension 64, the rear frames can be further slid to the front of the temples of the observer, and thus an opening for the occiput of the observer can be made wider. Consequently, the fear can be allayed that when the observer mounting the display on his head sinks onto a sofa or bed, his occiput is obstructed by contact with the display.

Further, since the finger holders 48 are used to spread out the rear covers 46 for the mounting or dismounting of the display, there is the fear that a joint between the finger holder 48 and the rear cover 46 becomes liable to start. Thus, in the tenth embodiment, provision is made for superposing the finger holder 48 on the rear cover 46 to form the joint. Its construction, as shown in FIGS. 20C and 20D, is such that the rear cover 46 is provided with bosses 65 and the finger holder 48 has bores at positions corresponding to the bosses 65 so that the cross section of the finger holder 48 has the shape of the letter "L". In this way, the force applied to the finger holder 48 is exerted so that the bores of the finger holder 48 interfere with the bosses 65 of the rear cover 46, and hence the finger holder 48 is not moved. The finger holder 48 is, therefore, hard to come off, and its strength is improved. Moreover, since a locking force is applied to the bosses 65 of the rear cover 46, an adhesive which is easy in treatment may be used as joining means. In this case, productivity is increased and the time needed for assembly can be reduced.

Figure 21A:
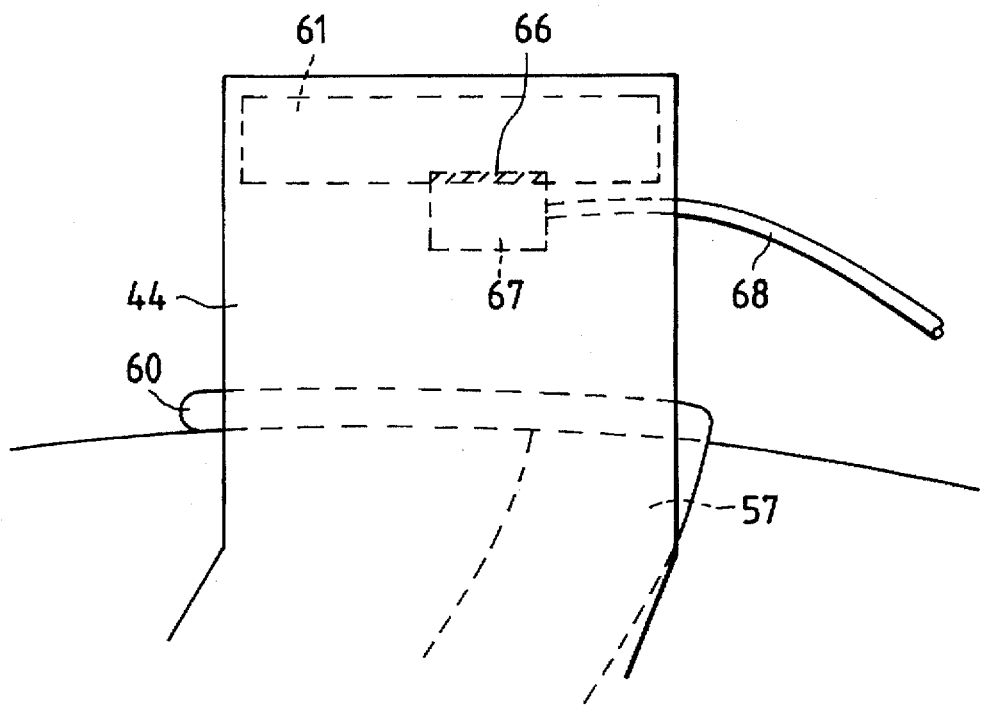
FIG. 21A is a side view showing a frame for the crown of the head used in the ninth and tenth embodiments.
Figure 21B:
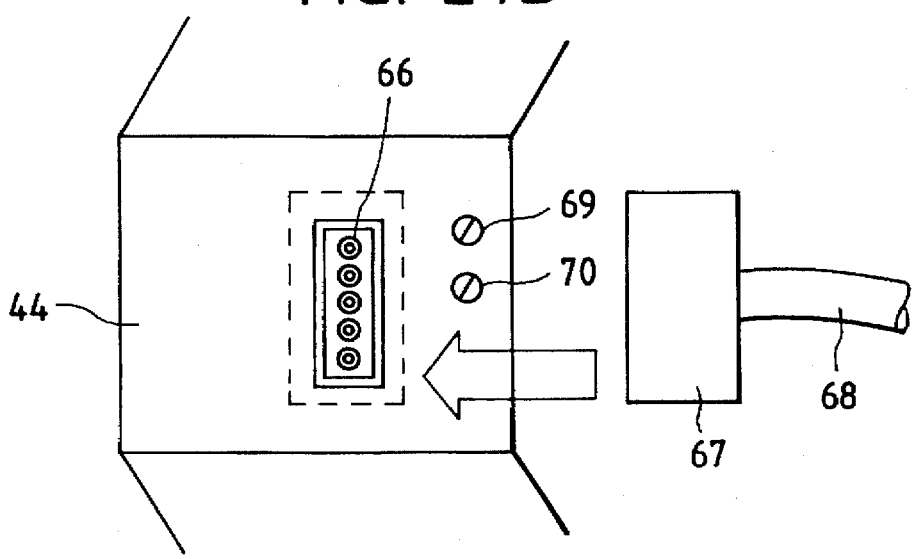
FIG. 21B is a bottom view of the frame for the crown of the head in FIG. 21A.

The ninth and tenth embodiments may be provided with the adjusting means of the electrical equipment 61 and image and sound adjusting means. Referring now to FIGS. 21A and 21B, their constructions will be explained below.

The electrical equipment 61 incorporates not only various circuits, but also devices such as an amplifier and a tuner, all of which may need adjustments. If the color balance of the image and the loudness and quality of sound are controlled, the observer can enjoy entertainment that a theatrical atmosphere prevails further. Thus, it becomes necessary to provide various adjusting means. However, it is unfavorable for appearance to place these adjusting means on the outside of the display. Turning attention to a structural feature of the crown frame 44 provided for improving the mounting, namely the fact that the adjusting member 58 is moved downward to thereby lower the crown cover 60 through the band 57 and a space is produced between the crown frame 44 and the crown cover 60, various adjusting means of the electrical equipment 61 are provided on the back surfaces of unit plane portions of the crown frame 44. In order to control the contrast and color balance of the image by adjusting the voltage of the electrical equipment 61, an internal connector 66 for receiving a voltage adjusting signal is provided on the back surface of each unit plane portion of the crown frame 44. By an external connector 67 designed so that a control signal from an external controller, not shown, can be transmitted through a cord 68 to the internal connector 66, the voltage of the electrical equipment 61 can be adjusted through the internal connector Apart from the internal connector 66, an image adjusting knob 69 and a loudness adjusting knob 70 may be provided so that the image display density of the LCD 52 and the loudness of the speaker 49 can be controlled. In this case, the knobs are turned to thereby make various adjustments. If the knobs project from the crown frame 44, there is the fear that the knobs interfere with the operation when the observer wears the display, or the observer touches the knobs in error to spoil the image and sound adjusted with effort. Thus, it is desirable that the knobs 69 and 70 are provided in recesses of holes on the back surface of the crown frame 44. Specifically, if each of the knobs 69 and 70 is designed so that it has a slot or cross recessed head and is turned with a minus or plus screwdriver, sufficient space will be provided and the danger can be avoided that malfunction is caused by the wearer.

The heads of observers vary in shape with sexes, ages, and races, and the display must be shaped to the head of an individual observer in order to comfortably wear the display. For this purpose, however, it is necessary to make various displays. This is unfavorable because in manufacture a high cost is caused and much time is required. Thus, in the present invention, as in the above embodiments, the crown cover 60 and the crown pad 60a are changed into various shapes and thereby can be applied to the heads of various shapes. In this way, a mounting effect can be improved. Also, for observers having extremely small heads like children, it is only necessary to replace the crown cover 60 or the crown pad 60a with that having the curved form of a radius of curvature R=60–80 mm in the lateral direction and R=140–180 mm in the longitudinal direction, for example.

What is claimed is:

1. A head mounted image display, comprising:
   a display body having image display sections and optical systems; and
   a supporting section for fixing said display body in front of eyes of an observer so that said image display sections can be viewed with the eyes of the observer, said supporting section being formed to include front stopper means to rest on a face of the observer, right-hand and left-hand side stopper means to rest on right and left temporal surfaces of the observer, and top stopper means to rest on a head crown of the observer so that said image display is held in place with an area over a middle occipital surface of the observer being free from said supporting section, said middle occipital surface being defined, on a head of the observer, as a region positioned opposite to a facial region to be covered by said display body, whereby a pushing and pulling of said image display for mounting and removing the same on and from the head of the observer being allowed to be carried out in directions normal to the face or a sincipital surface of the observer.

2. A head mounted image display according to claim 1, wherein said right-hand and left-hand side stopper means are arranged to rest on portions, of said right and left temporal surfaces, above right and left ears of the observer.

3. A head mounted image display according to claim 1, wherein said right-hand and left-hand side stopper means are arranged to rest on portions, of said right and left temporal surfaces, behind right and left ears of the observer.

4. A head mounted image display according to claim 1, wherein said right-hand and left-hand side stopper means are arranged to rest on right and left ears of the observer.

5. A head mounted image display according to claim 1, wherein said right-hand and left-hand side stopper means are arranged to rest on portions of said right and left temporal surfaces, above right and left ears of the observer and on portions, of said right and left temporal surfaces, behind the right and left ears of the observer.

6. A head mounted image display according to claim 1, wherein said top stopper means includes two separate means arranged to rest on two portions of said head crown of the observer, said two portions being separate from one another in a lateral direction.

7. A head mounted image display according to any one of claims 1, 2, or 6, wherein said right-hand and left-hand side stopper means and said top stopper means are formed on frame members of said supporting section, said frame members being arranged on right-hand and left-hand sides of said display body.

8. A head mounted image display according to claims 3 or 4, wherein said right-hand and left-hand side stopper means are positioned below frame members of said supporting section as said image display is held in place, said frame members being arranged on right-hand and left-hand sides of said display body.

9. A head mounted image display according to claims 3 or 5, wherein said right-hand and left-hand side stopper means include rear plates made of an elastic material and rear covers coupled to said rear plates, said rear plates and said rear covers being arranged to rest on said portions behind the ears of the observer.

10. A head mounted image display according to claim 9, wherein said rear covers are lined with rear pads made of a foamed resin, said foamed resin having a foam density of 20–60 and a compression rate of 1/3 or less.

11. A head mounted image display according to any one of claims 1, 2, 3, 4, or 5, wherein said top stopper means is a crown cover having a radius of curvature of 50–150 mm as measured in a lateral direction.

12. A head mounted image display according to any one of claims 1, 2, 3, 4, or 5, wherein said top stopper means is a crown cover having a radius of curvature of at least 50 mm as measured in a longitudinal direction.

13. A head mounted image display according to any one of claims 1, 2, 3, 4, or 5, wherein said top stopper means is lined with a crown pad made of a foamed resin, said foamed resin having a foam density of 20–60 and a compression rate of 1/3 or less.

14. A head mounted image display according to claim 6, wherein each of said two separate means of said top stopper means is line with a crown pad made of a foamed resin, said foamed resin having a foam density of 20–60 and a compression rate of 1/3 or less.

15. A head mounted image display according to any one of claims 1, 2, 3, 4, 5, or 6, wherein frame members of said supporting section are arranged to extend from said display body to said top stopper means via routes along said right and left temporal surfaces of the observer so that said display body and said frame members substantially surround said sincipital surface of the observer.

* * * * *